(12) United States Patent
Kwak et al.

(10) Patent No.: US 6,963,547 B1
(45) Date of Patent: Nov. 8, 2005

(54) LOCAL MULTIPOINT DISTRIBUTION SYSTEM AND ATM DATA COMMUNICATION METHOD THEREOF

(75) Inventors: Ok Moon Kwak, Kyonggi do (KR); Kwang Ju Choi, Kyonggi do (KR); Jee Woon Youm, Seoul (KR); Dong Hyun Kim, Kyonggi-do (KR); Doo Il Park, Kyonggi do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/474,025

(22) Filed: Dec. 28, 1999

(30) Foreign Application Priority Data

Dec. 29, 1998 (KR) ........................................ 1998/60405
Dec. 29, 1998 (KR) ........................................ 1998/60407
Dec. 30, 1998 (KR) ........................................ 1998/61810

(51) Int. Cl.$^7$ ............................................ H04B 7/00
(52) U.S. Cl. ................ 370/310.1; 370/312; 370/395.1; 370/485
(58) Field of Search .............................. 370/310.1, 312, 370/329, 389, 392, 395.1, 395.2, 466, 469, 485, 486, 487, 535, 395.52, 351, 352, 353, 354, 355, 356, 395.64, 400, 338

(56) References Cited

U.S. PATENT DOCUMENTS

| | | | |
|---|---|---|---|
| 5,561,466 A | * | 10/1996 | Kiriyama |
| 5,717,691 A | * | 2/1998 | Dighe et al. ................. 370/401 |
| 5,809,431 A | | 9/1998 | Bustamante et al. ........ 455/562 |
| 5,825,766 A | * | 10/1998 | Kobayashi et al. |
| 5,905,781 A | * | 5/1999 | McHale et al. .......... 370/93.14 |
| 5,936,949 A | * | 8/1999 | Pasternak et al. ........... 370/328 |
| 5,987,025 A | * | 11/1999 | Hokari |
| 6,101,174 A | * | 8/2000 | Langston .................... 370/312 |
| 6,151,312 A | * | 11/2000 | Evans et al. ................ 370/338 |
| 6,356,537 B1 | * | 3/2002 | Jaakkola et al. ......... 370/310.2 |
| 6,490,251 B2 | * | 12/2002 | Yin et al. ................ 370/236.1 |
| 6,522,641 B1 | * | 2/2003 | Siu et al. .................... 370/338 |
| 6,665,279 B1 | * | 12/2003 | Kwak et al. ................ 370/328 |

* cited by examiner

*Primary Examiner*—Chi Pham
*Assistant Examiner*—Anh-Vu Ly
(74) *Attorney, Agent, or Firm*—Fleshner & Kim

(57) ABSTRACT

Disclosed a local multipoint distribution system (LMDS) and method of communicating ATM data on the LMDS that establishes a virtual circuit using a head-end unit to allow a bidirectional communication on ATM network and provide a medium access control(MAC) protocol by the head-end unit to perform multiplexing/demultiplexing and routing operations for data to be transmitted or received. The local multipoint distribution system comprising: a central office unit for multiplexing or demultiplexing an inputted data stream; a head-end unit for modulating downstream data of ATM cell structure provided from the central office unit, or demodulating an inputted upstream data and forwarding the central office unit; and a hub outdoor unit for converting the downstream data from the head-end unit with low frequency and transmitting to corresponding user application, or converting the upstream data received from the user application with high frequency and forwarding to the head-end unit, wherein, the central office unit or the head-end unit establish a virtual channel between the central office unit and the head-end unit to enable bidirectional communication in ATM network, and provides MAC protocol and routes a received data to a corresponding destination by multiplexing or demultiplexing the data.

28 Claims, 11 Drawing Sheets

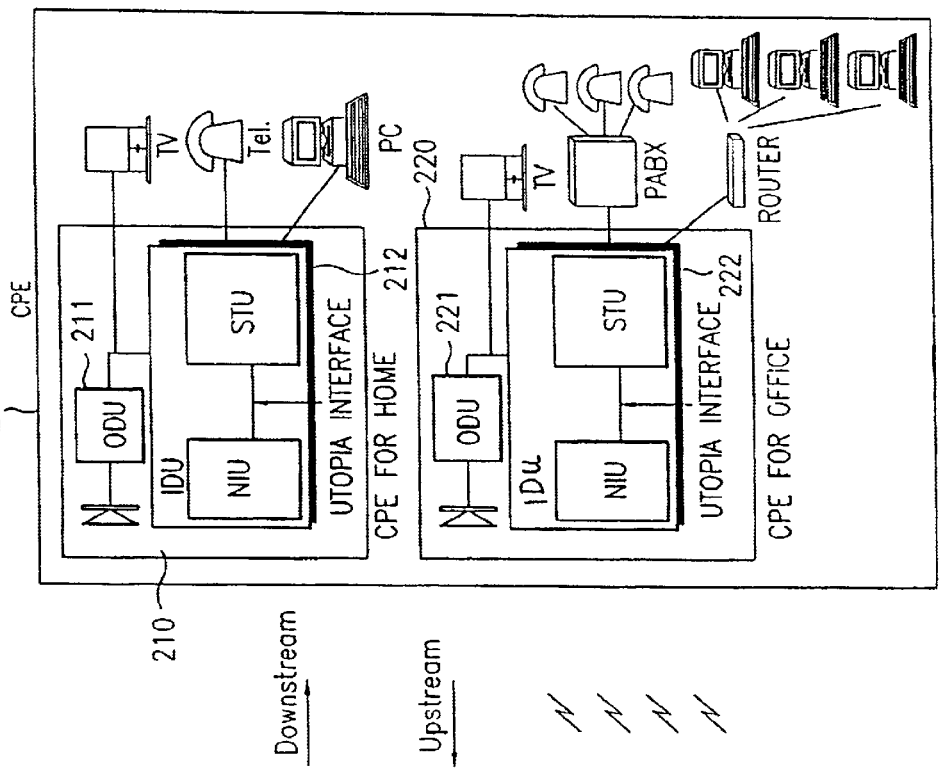

LOCAL MULTIPOINT DISTRIBUTION SYSTEM AND ATM DATA COMMUNICATION METHOD THEREOF

BACKGROUND OF THE INVENTION

1. Field of the Invention

The present invention relates to a local multipoint distribution system (LMDS) and more particularly to a LMDS and method of communicating asynchronous transfer mode (ATM) data.

2. Background of the Related Art

A LMDS is a broadband wireless network which provides high speed broadband multimedia service to subscribers using a millimeter band frequency for customer circuits. LMDSs have been developed to efficiently distribute cable television channels, and has gradually evolved to bidirectional digital communication systems. The LMDS can provide various services such as voice telephone service, data communication service, multimedia service processing with audio, video, and data information, or exclusive lines service. The LMDS has advantages over general networks of wire communication systems in view of easiness, extensional, and economical efficiency.

Presently, numerous countries are developing wireless network services with their own project names. For example, the USA is developing Local Multipoint Distribution Systems (LMDS), Canada is developing Local Multipoint Communication Systems (LMCS), Japan is developing ATM Wireless Access (AWA) systems, and Korea is developing Broadband Wireless Local Loop (B-WLL) systems, respectively.

The Digital Audio Visual Council (DAVIC) has proposed standardization for wireless network services, such as for LMDS, which was published from version 1.1 to version 1.3 of their proposals. The suggested proposals were for Downstream Time Division Multiplexing, Upstream Time Division Multiple Access (MA), downstream or upstream frame structure, and Medium Access Control (MAC) Protocol, etc. The LMDS includes a service provider and customer premises equipment units (CPE) for performing wireless communication with the service provider. The service provider includes a central office unit(COU) for transmitting a digital data stream received from a program provider, a head-end unit for receiving downstream data from the CPE, for modulating and transmitting the downstream data, and for demodulating and transmitting a received upstream data from a base station to the CPE. The service provider also includes a hub outdoor unit for amplifying the downstream data and performing frequency conversion for transmission to corresponding CPEs via a antenna, amplifying the upstream data, and performing frequency conversion for transmission to the head-end unit.

However, each inner block of LMDS structure was not disclosed in detail, in the proposals, due to a policy of protecting the technology developed by each country. Specifically, any specifications for system developers and proposal for ATM signal treatment over a LMDS was not suggested in the latest DAVIC version. Accordingly, an improved LMDS is needed which can be easily embodied to allow ATM signal treatment work with developed or developing LMDSs.

SUMMARY OF THE INVENTION

An object of the invention is to solve at least the above problems and/or disadvantages and to provide at least the advantages described hereinafter.

Another object of the present invention is to provide asynchronous transfer mode (ATM) signal processing and medium access control (MAC) protocol between a service provider and a customer premises equipment unit (CPE).

Another object of the present invention is to provide a local multipoint distribution system (LMDS).

Another object of the present invention is to provide a method for communicating ATM data.

Another object of the present invention is to provide a virtual circuit with a head-end unit.

Another object of the present invention is to allow a bidirectional communication on an ATM network.

Another object of the present invention is to provide a medium access control (MAC) protocol by the head-end unit.

Another object of the present invention is to provide a head-end unit that performs multiplexing/demultiplexing and routing operations for data to be transmitted or received.

Another object of the present invention is to establish a virtual circuit by a network connection unit of a central office unit.

Another object of the present invention is to provide a medium access control (MAC) protocol by a network connection unit of a central office unit and perform multiplexing/demultiplexing and routing operations for data to be transmitted or received.

The present invention can be achieved, as a whole or in parts, by a local multipoint distribution system including a central office unit for multiplexing or demultiplexing an inputted data stream; a head-end unit for modulating downstream data of ATM cell structure provided from the central office unit, or demodulating an inputted upstream data and forwarding the central office unit; and a hub outdoor unit for converting the downstream data from the head-end unit with low frequency and transmitting to corresponding user application, or converting the upstream data received from the user application with high frequency and forwarding to the head-end unit, wherein, the central office unit or the head-end unit establish a virtual channel between the central office unit and the head-end unit to enable bidirectional communication in ATM network, and provides MAC protocol and routes a received data to a corresponding destination by multiplexing or demultiplexing the data.

The present invention can also be achieved, as a whole or in parts, by a local multipoint distribution system, comprising a central office unit for multiplexing a downstream data stream having an asynchronous transfer mode (ATM) cell structure, or demultiplexing an upstream data stream having the ATM cell structure, and a head-end unit for modulating the multiplexed downstream data stream having the ATM cell structure provided from the central office unit, and demodulating an inputted upstream data into the data stream and forwarding the data stream to the central office unit, wherein one of the central office unit or the head-end unit establishes a virtual channel between the central office unit and the head-end unit to enable bidirectional communication in a communication network, and provides a medium access control (MAC) protocol for routing a data, including the data stream, the downstream data stream, and the upstream data stream, to a corresponding destination.

The present invention can also be achieved, as a whole or in parts, by a method of communicating data in a local multipoint distribution system having a network connection unit, a head-end unit, and customer premises equipment, the method comprising establishing a virtual channel by performing a protocol communication from a first physical layer for prescribing wireless access media, to a second physical layer for providing wireless media control, of the customer premises equipment and either the network connection unit or the head-end unit, connecting a communication path from one of the network connection unit and the head-end unit to a terminating party by performing a protocol communication between an adaption layer for signal processing to a user network interface layer of the customer premises equipment and the one of the network connection unit and the head-end unit, processing the data between the terminating party and one of the network connection unit and the head-end unit, and transmitting the data between the terminating party and one of the network connection unit and the head-end unit.

The present invention can also be achieved, as a whole or in parts, by a network communication unit of a local multipoint distribution system, comprising a converter that multiplexes or demultiplexes a data stream a signal processor that establishes a virtual channel to enable bidirectional communication in a communication of the data stream with a destination, and a controller coupled to the signal processor, that controls a routing of the data stream to the destination.

The present invention can also be achieved, as a whole or in parts, by a head-end unit of a local multipoint distribution system, comprising a processor that provides a medium access control protocol for routing a data stream in a communication network, a modem for modulating and outputting the data stream from the processor into a low frequency downstream data stream, or converting a low frequency upstream data stream into the data to be outputted to the processor, a frequency converter for converting an intermediate frequency upstream data stream into the low frequency upstream data stream and forwarding the low frequency upstream data stream to the modem, or converting the low frequency downstream data stream into an intermediate frequency downstream data stream having an intermediate frequency bandwidth.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements, and wherein:

FIGS. 1a and 1b are block diagrams illustrating a LMDS according to a first preferred embodiment of the present invention;

DETAILED DESCRIPTION OF PREFERRED EMBODIMENTS

Figure 1A:
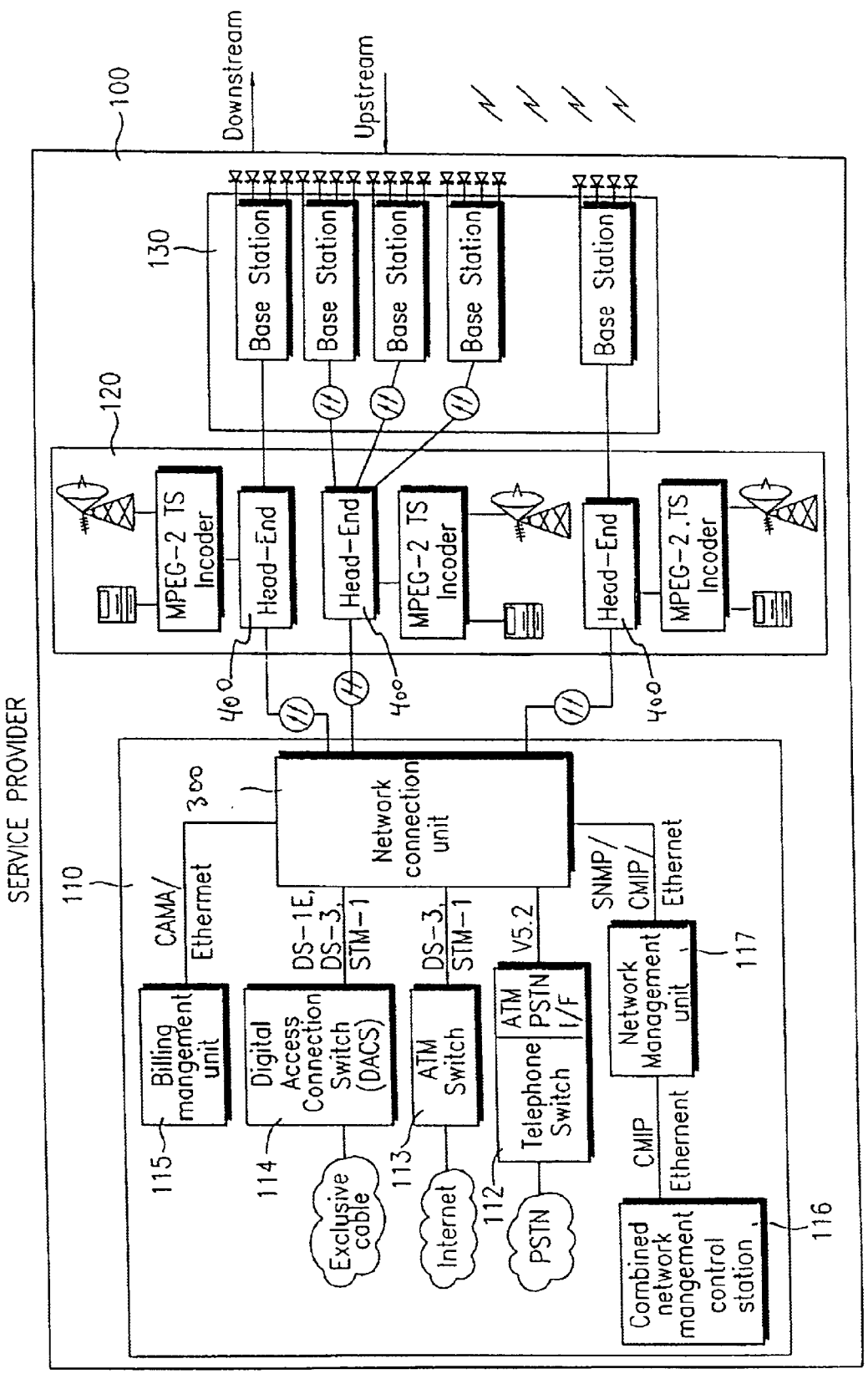

FIGS. 1a and 1b are block diagrams of a LMDS according to a first preferred embodiment of the present invention. Referring to FIGS. 1a and 1b, the LMDS includes a service provider 100 and a customer premises equipment unit (CPE) 200. The service provider 100 includes a central office unit (COU) 110, a head-end section 120, and a hub outdoor unit 130. The COU 110 multiplexes programs and service contents as a digital downstream data from a program provider, and demultiplexes an inputted upstream data. The head-end section 120 modulates the downstream data as an asynchronous transfer mode (ATM) cell and demodulates and transmits the upstream data to the central office unit 110. The hub outdoor unit 130 amplifies the downstream data and performs frequency conversion for transmission to a customer premises equipment unit (CPE) 200 via a high directivity antenna. The hub outdoor unit 130 also amplifies the upstream data and performs frequency conversion for transmission to the head-end section 120.

The central office unit 110 includes an ATM switch 113, a telephone switch 112, a digital access connection switch (DACS) 114, a billing management unit 115, a network connection unit 300, a network management unit 117 and a combined network management control station 116. The ATM switch 113 is preferably connected to the Internet by transmission control protocol/Internet protocol (TCP/IP) to provide ATM-LAN service to the CPE 200. The ATM switch 113 analyses and exchanges the ATM cell data after forming a frame structure for accommodating data of a digital hierarchy signal, such as a digital signal level (DS-1E) of 2.048 Mbps, a digital signal level(DS-3) of 44.736 Mbps, or a digital signal level (STM-1) of 155.52 Mbps. The telephone switch 112 establishes a communication path for accessing a public switching telephone network (PSTN) and connects to a network connection unit 300 in accordance with a protocol, such as the V 5.2 protocol.

After forming a frame structure for accommodating a representative digital hierarchy signal, such as the digital signal level (DS-1E) of 2.048 Mbps, the digital signal level (DS-3) of 44.736 Mbps, or the digital signal level (STM-1) of 155.52 Mbps, the digital access connection switch (DACS) 114 forms and transmits data from an exclusive cable to the network connection unit 300. The network connection unit 300 multiplexes/demultiplexes and routes the data stream from the ATM switch 113, the telephone switch 112, or the digital access connection switch (DACS) 114, and forwards the data stream to the head-end section 120. The network management unit 117 and the combined network management control station 116 manages the entire LMDS network. The Billing Management Unit 115 processes billing information for each subscriber connected to the CPE 200.

The network management unit 117 and the combined network management control station 116 perform the management of all operation and information for the CPE 200 by exchanging in formation with the network connection unit 300, and performing the management of the network connections and operating states between the network connection unit 300 and base stations of the hub outdoor unit 130. To perform such management, Simple Network Management Protocol (SNMP) and Common Management Information Protocol (CMIP) can be used between the network connection unit 300 and the network management unit 117. Also, the same protocols can be used between the network management unit 117 and the combined network management control station 116. The Billing Management Unit 115 processes the billing information generating from each subscriber using a Central Automatic Message Accounting (CAMA) approach.

The CPE 200 divides outdoor units (ODU) 211 and 221 and indoor units (IDU) 212 and 222 in accordance with system requirements. For example, the CPE 200 divides a home CPE 210 having television sets, telephone sets, personal computers (PC) and peripheral devices, and divides a office CPE 220 that additionally has a Private Automatic Branch Exchange (PABX) for supporting voice service and a router for supporting data service. Each outdoor unit 211 and 221 converts frequency and amplifies the downstream data via the high directivity antenna to be forwarded to a network interface unit (NIU), or converts frequency and amplifies the downstream data provided from the network interface unit (NIU) to be transmitted to a wireless area via the high directivity antenna.

The network interface unit (NIU) of the indoor units (IDU) 212 and 222 interface between the respective outdoor unit (ODU) 211 and 221, and the peripheral devices, such as data terminals. The set-top unit (STU) of the IDUs 212 and 222 provides communication functions to the peripheral devices as a video server, image signal receiving/exchanging function, data communication service, etc.

The interface between the corresponding network interface unit (NIU) and set-top unit (STU), included in the home CPE 210 and the office CPE 220 follows Universal. Test & Operations PHY interface for ATM (UTOPIA), which is an electrical interface of Large Semiconductor Integrated Microprocessors (LSI) for ATM protocol. The office CPE units 210 and 220 can also provide LAN service by which the subscriber can use Ethernet.

In a second preferred embodiment of the present invention, a head-end unit 400 of the local multipoint distribution system (LMDS) establishes a virtual circuit to allow a bidirectional communication on an ATM network. The head-end unit 400 also provides a medium access control (MAC) protocol to perform multiplexing/demultiplexing and routing operations for data to be transmitted or received.

Figure 2:
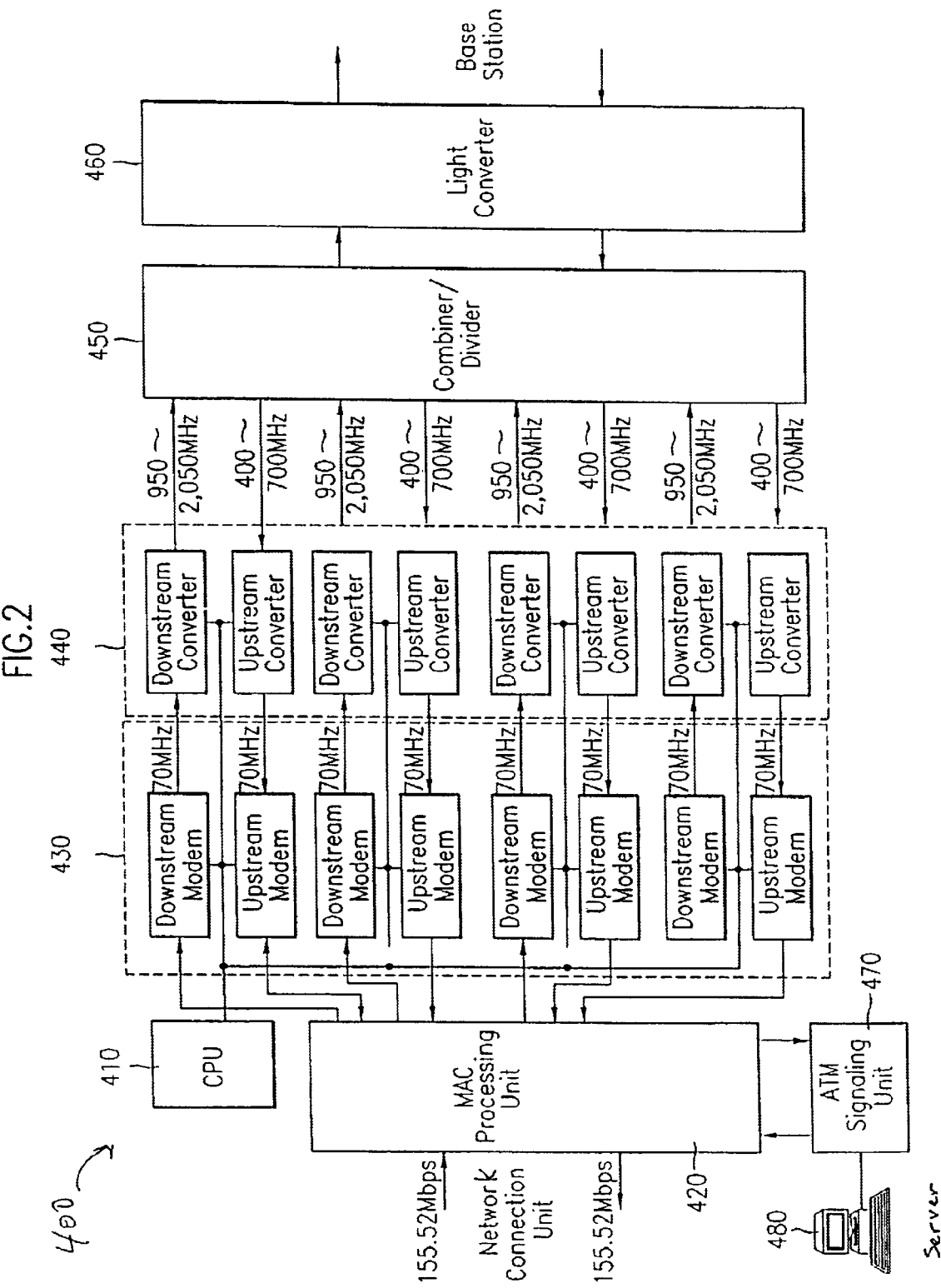
FIG. 2 is a block diagram of a head-end unit of a LMDS according to a second preferred embodiment of the present invention.

FIG. 2 is a block diagram of the head-end unit 400, shown in FIG. 1, according to a second preferred embodiment of the present invention. Referring to FIG. 2, the head-end unit 400 includes a control processing unit (CPU) 410, a MAC processing unit 420, a modem section 430, a frequency converting section 440, a combiner/divider 450, and a light converter 460. The head-end unit 400 may also include an ATM signalling unit 470 and a server 480.

The central processing unit (CPU) 410 controls the entire operations of the head-end unit 400. The MAC processing unit 420, connected to the network connection unit 300 of the COU 110, multiplexes/demultiplexes ATM data in an ATM network for a digital signal level, such as STM-1 of 155.52 Mbps, and routes the data to a corresponding CPE 200 after analysing the received data from the network connection unit 300, or forwards the data to the network connection unit 300 after analysing the received data from the CPE 200, or from a corresponding CPE 500 and 510, which may be substantially similar to the CPE 200. A modem section 430 includes a plurality of downstream modems 432 for modulating and outputting received downstream data from the MAC processing unit 420 and includes a plurality of upstream modems 434 for converting inputted upstream data to the ATM cell data to be outputted to the MAC processing unit 420.

A frequency converting section 440 includes a plurality of upstream converters 444 for converting the upstream data to a low frequency bandwidth and forwarding the low frequency upstream data to the upstream modems 434 of the modem section 430, and also includes a plurality of downstream converters 442, for converting and outputting the received modulated signal from the modem section 430 at an inter-frequency bandwidth. A combiner/divider 450 combines and outputs the output modulated signal at the channel frequency at an inter-frequency bandwidth from each downstream converter 442, or divides and forwards an inputted electrical signal to the frequency converting section 440. A light converter 460 converts and outputs the output signal of the combiner/divider 450 into a light signal, or converts the upstream data received through a light cable into an electrical signal. An ATM signalling unit 470 and a sever 480 connect a virtual channel to allow bidirectional communication on the ATM network according to a control signal from the MAC processing unit 420.

Figure 3:
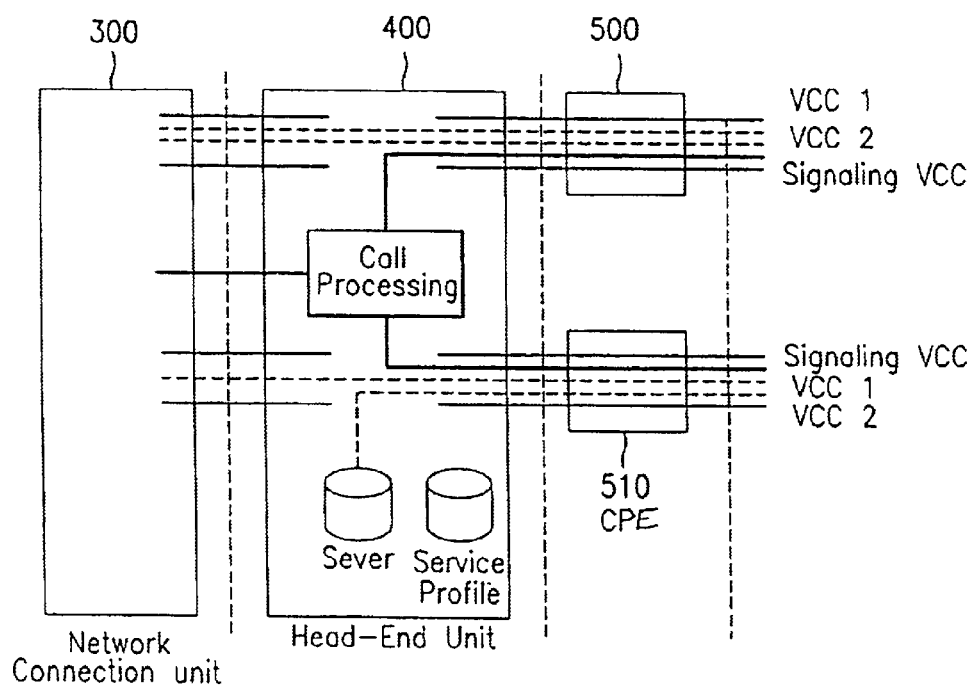
FIG. 3 is a view illustrating a connection state of a virtual channel for processing ATM signalling for a head-end unit according to the second preferred embodiment of the present invention.

The MAC processing unit 420 generates a constant bit rate data, a variable bit rate data, or control data corresponding to the received data type and forwards the data to corresponding CPEs 200, 500 and 510 via a corresponding base station in the hub outdoor unit 130. The MAC processing unit 420 multiplexes the ATM data to perform ATM communication for data at a digital signal level, such as STM-1 of 155.52 Mbps, and routes the received ATM data from the network connection data, after first analysing the received data to be forwarded to the corresponding CPE 500 and 510. To perform this operation, the MAC processing unit 420 forwards the control data to the ATM signalling unit 470 to allow bidirectional communication on an ATM network as shown in FIG. 3. In this example of an ATM network, the downstream data size is 188 bytes depending on the DAVIC recommendations. The MAC processing unit 420 forms such downstream data and forwards it to the corresponding downstream modem 432 of the modem section 430. The MAC processing unit 420 also processes control data passed through the upstream modem 434.

Each downstream modem 432 of the modem section 430 encodes the downstream data of, for example, 188 bytes received from the MAC processing unit 420 using a Reed Solomon approach, and generates downstream data of, for example, 204 bytes by adding 16 bytes of surplus data. Next, convolution interleaving (I=12, M=17) and convolution encoding (R=½, K=7) to the downstream data are performed and then modulated in an orthogonal phase shift manner. Next, a carrier frequency of, for example, 70 MHz is transmitted to the downstream converter 442 of the frequency converting section 440. Such downstream converter converts the modulated signal from the downstream modem into inter-frequencies of about 950~2,050 MHz and forwards the resulting signal to the combiner/divider 450. The combiner/divider 450 combines a plurality of inter-frequency signals transmitted from each downstream modem and forwards the combined signal to the light converter 460 for converting the combined signal to a light conversion signal and transmitting the light conversion signal to the base station 400.

Upstream data transmitted from CPE 500 or 510 is converted into the lower frequency at a base station 135 and is transmitted to the respective head-end unit 400 via the light cable. The light converter 460 of the head-end unit 400 converts the received upstream data via the light cable into an electrical signal, and the combiner/divider 450 divides the electrical signal into a plurality of electrical signals, such as three signals, and forwards them to the frequency converting section 440.

Each upstream converter 444 of the frequency converting section 440 converts the received upstream data into the low frequency data of, for example, 70 MHz and forwards the converted upstream data to a corresponding upstream modem 434 of the modem section 430. Next, each upstream modem 434 of the modem section 430 converts the upstream data of, for example, 63 bytes in size into ATM cell data of, for example, 53 bytes by applying a Reed Solomon approach as a forward error correction technique. The upstream modem then forwards the ATM cell data to the MAC processing unit 420.

The MAC processing unit 420 receives and analysis the upstream data. If the data is control data, the upstream data is forwarded to the ATM signalling unit 470, while if the data is actual data for transmission, it is multiplexed into 155.52 Mbps data and forwarded to the network connection unit 300. Accordingly, the network connection unit 300 transmits the multiplexed ATM cells to a corresponding destination. The sever 480 constructs and manages a data base for managing a service profile of all subscribers. The head-end unit 400 provides a switch function via the virtual channel connection(VCC) between CPEs 500 and 510 and the Network connection unit 300, as shown in FIG. 3. If a channel assignment is requested by a user from the CPE 500 or 510, the head-end unit 400 performs an authentication procedure using a database system from the server 480, to confirm whether the user who requested the channel assignment is an authenticated subscriber. If the user is an authenticated subscriber, the channel is assigned. However, if the user is not an authenticated subscriber, the head-end unit 400 transmits an error message to the user who requested the channel assignment.

The virtual channel connection (VCC) should also be established between the network connection unit 300 and the head-end unit 400, so that several subscribers can use the virtual channel simultaneously. Accordingly, a manager for the network connection unit 300 should provide access for several peripheral devices via the head-end unit 400. Thus, ATM data, which is exchanged between the network connection unit 300 and CPEs 500 and 510, is transmitted via the head-end unit 400, which negotiates service ranges, traffic contracts, and service quality parameters, to provide support for sub service of a control plane, and control operations for origination ID confirmation and authorization.

Regarding the negotiation of the service quality parameter, violation of the negotiated parameters should be detected to perform proper controls, while a confirmation or verification of an origination number may be performed for a local identifier which is given to merely identify a user application among all applications, or for identification of secret codes, etc.

Figure 4:
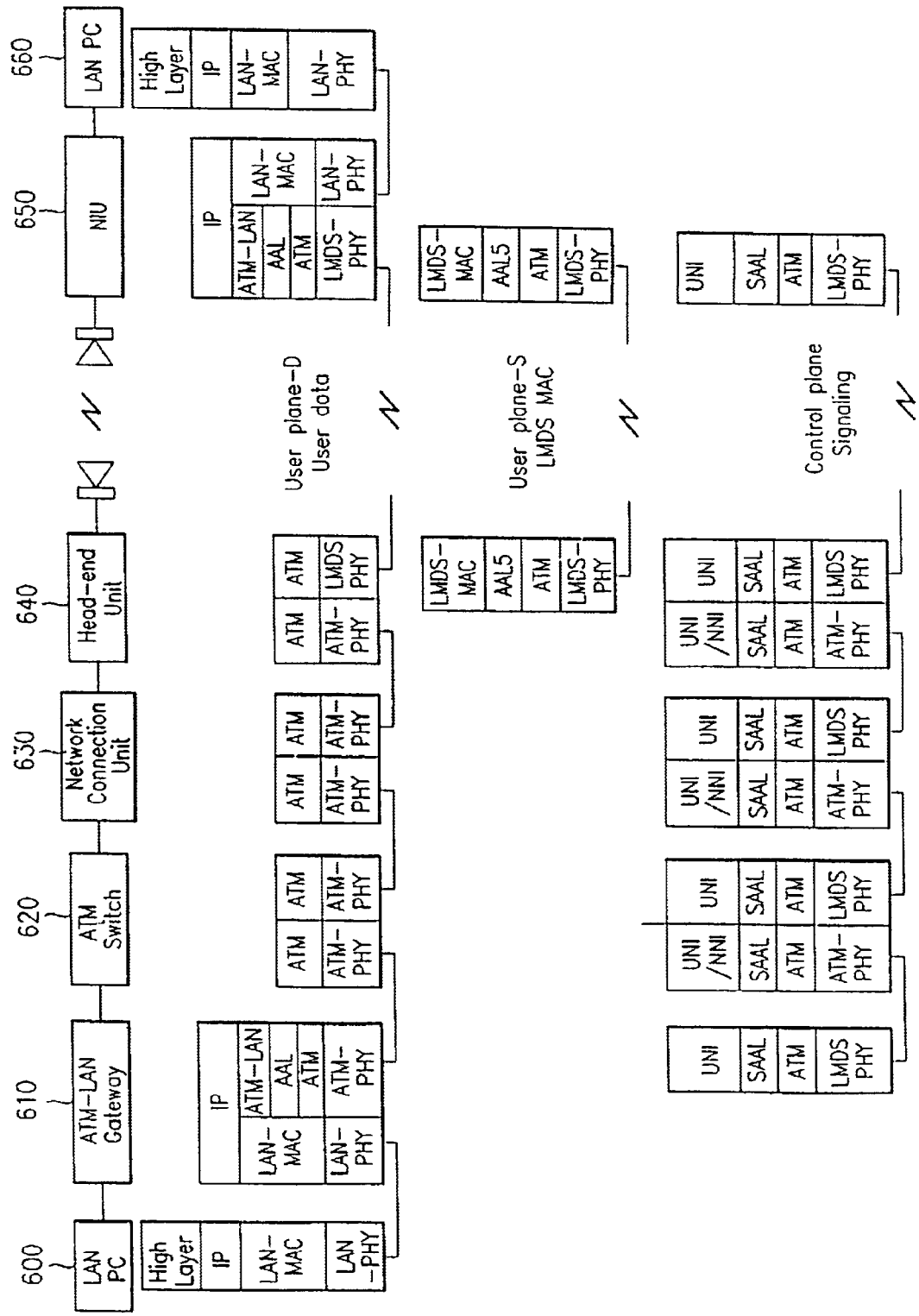
FIG. 4 is a block diagram of a LMDS according to the second preferred embodiment of the present invention.

FIG. 4 illustrates a block diagram of a LMDS according to the second preferred embodiment of the present invention. With reference to FIG. 4, the block diagram includes a protocol stack configuration having a user plane-D for transmitting user data, a user plane-S for transmitting LMDS MAC messages, and a control plane for processing a signalling procedure. To perform data service using the second preferred embodiment of the present invention, the virtual channel connection (VCC) should be established between the head-end unit 640 and the network interface unit (NIU) 650 of a CPE by performing protocol communication from the LMDS-PHY layer of the user plane-S to the LMDS-MAC layer of the user plane-S. After establishing the virtual channel connection (VCC), a protocol communication is performed between the SAAL and UNI layers of the head-end unit 640, and the NIU 650 via the control plane, thereby providing a communication path between the head-end unit 640 and a LAN PC terminal 600 via an ATM-LAN gateway 610. Thus, signal processing is completely performed from the NIU650 to the terminating LAN PC terminal 600. Each LAN PC terminal 600 and 660 can transmit/receive the user data to and from each other via the user plane-D.

The provisions for the each layer in the protocol stack are disclosed in detail in the DAVIC. Selection and realization protocols for signal processing is described below, with reference to the following layers.

The ATM layer includes data, such as 53 byte data, with a constant length cell through respective the physical layer. The ATM Adaptation Layer (AAL) allows voice, image and data services, which have other characteristics, to be provided to an upper application ATM layer that matches their characteristics. The AAL controls the user data of, for example, 48 byte length which is treated in common on the ATM cell in order to match the data unit of various upper applications. The SAAL level is an ATM Adaptation Layer for signal processing in a digital switch system. The ATM-PHY is a physical layer for transmitting ATM cell data. A physical layer access media for performing ATM-PHY is described in I.432 of the ITU-T I series.

The UNI layer is a user-network interface prescribing interface between the user application and the network. This layer is subjected to the digital signalling switch system and ITU-T Q series prescribing common line signalling system, UNI 4.0 and other systems recommended in ITU-T Q.2931. The NNI layer is network-network interface prescribing interface for interworking between various networks. This layer is subjected to the ITU-T Q series describing the digital signal switch system. The common line signal system, such as the UNI, and ITU-T Q.2761~Q.2764 may be also used.

The LMDS PHY layer is a LMDS physical layer prescribing wireless access media and subjected to DAVIC version 4.0. The LAN-PHY layer is a LAN physical layer describing LAN access media. This layer is prescribed in IEEE 802.3 which is an Ethernet standardization regulation and IEEE 802.4 which is a regulation of a bus network controlling network access and communication amount by using token passing manner, and IEEE 802.5 which is a regulation for LAN protocol. The LAN-MAC layer provides LAN media control function, and is prescribed in IEEE 802.3, IEEE 802.4 and IEEE 802.5.

According to the previously discussed embodiment of the present invention, the head-end unit 640 performs numerous service functions including an ATM signalling function, a MAC processing function, but does not perform billing service. Thus, if other communication apparatuses, such as the network connection unit 300 is already developed, the improved head-end unit 640 of the present invention can be applied on a LMDS without changing the entire system. Also, the head-end unit 640 can be realized as an independent system, since only the improved head-end unit 640 is replaced in the entire system, and can thus be easy to interwork with other systems. Also, all signalling is processed in the head-end unit 640, thereby reducing the speed of ATM signalling.

In the third preferred embodiment of the present invention, the network connection unit 300 of the local multipoint distribution system (LMDS) establishes a virtual circuit to allow a bidirectional communication on an ATM network and provides a medium access control (MAC) protocol to perform multiplexing/demultiplexing and routing operations for data to be transmitted or received.

Figure 5:
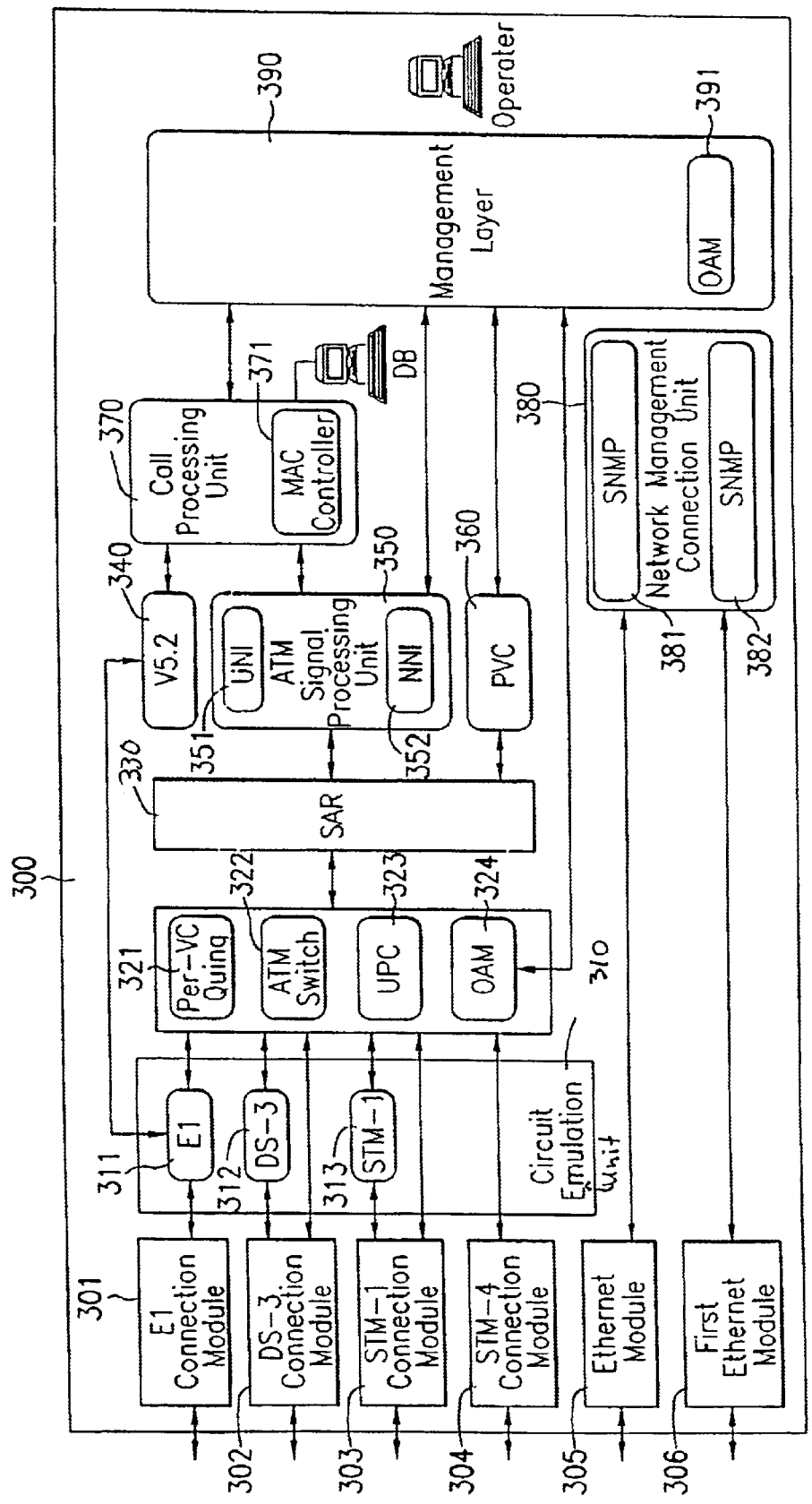
FIG. 5 is a block diagram of a network connection unit of the LMDS according to a third preferred embodiment of the present invention.

In order to achieve the third preferred embodiment of the present invention, the network connection unit is constructed, for example, as shown in FIG. 5. The network connection unit 300 includes connection modules 301 to 306, a circuit emulation unit 310, an ATM switch 322, a usage parameter controller (UPC) 323, a segmentation and reassembling section (SAR) 330, an ATM signal processing unit 350, a call processing unit 370, a network management connection unit 380, and a management layer 390.

The connection modules 301 through 306 connect to switches in the central office unit 110. The circuit emulation unit 310 exchanges data formation when the data is communicated via any of the connection modules 301 through 306. The ATM switch 322 connects to the circuit emulation unit 310, for switching inputted ATM cell data. The usage parameter controller (UPC) 323 connects to the circuit emulation unit 310, for detecting an error of the established call connection and performing proper controlling. The segmentation and reassembling section (SAR) 330 segments data provided from the ATM switch 322 or the UPC 323, and assembles data provided from the ATM signal processing unit 350. The ATM signalling processing unit 350 sets a virtual channel service manner and channel speed, and provides ATM service corresponding to the set service. The call processing unit 370 includes a MAC controller 371 for controlling a user modems of the CPEs 500 or 510 by MAC control instruction when the ATM signal processing unit 350 provides the ATM service.

Each of the connection modules 301 through 306 receives data forwarded from switches 112 through 114 and searches for corresponding frame synchronization from the received data stream and then extracts corresponding billing information. Also, Each connection module 301 through 306 creates frames to be transmitted and maps the corresponding billing information from the billing management unit 115. The ATM switch 322 switches ATM cell data provided from the corresponding connection module 301 through 306 via the circuit emulation unit 310. The UPC 323 protects the network resource from abnormal operation or errors effecting the service quality of the established call connection, and detects a parameter violation and performs proper controlling.

The SAR 330 segments the data provided from the ATM switch 322 or UPC 323 and outputs it to the ATM signal processing unit 350, and assembles the data provided from the ATM signal processing unit 350 for output to the ATM switch 322. The ATM signalling processing unit 350 establishes the virtual channel with a permanent virtual connection (PVC) or a switched virtual connection (SVC) approach, and operates the user-network interface (UNI) 351 and the network-network interface (NNI) 352 based on the type of bit rate, for example, constant bit rate, variable bit rate, unspecified bit rate, or available bit rate.

Figure 6:
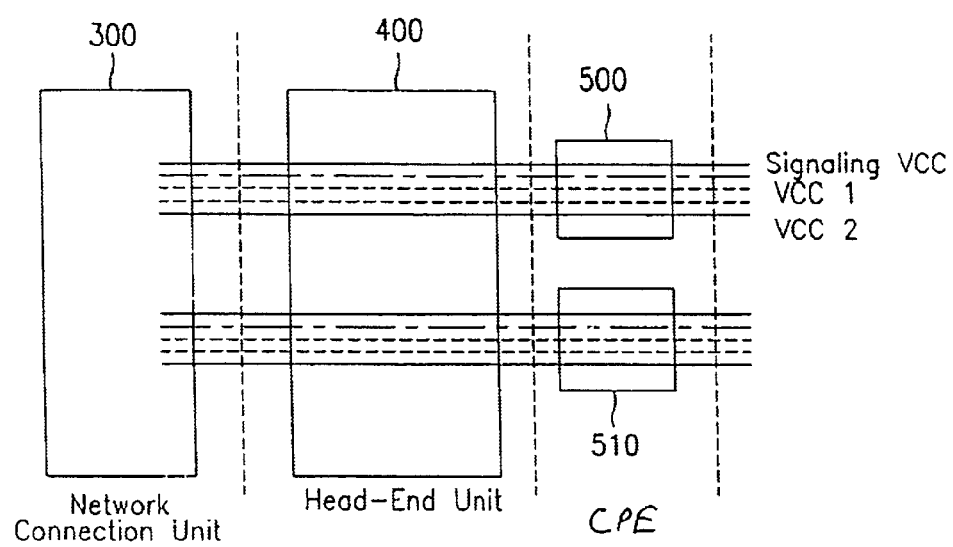
FIG. 6 is a view illustrating a connection state of a virtual channel for processing ATM signalling for a network connection unit according to the third preferred embodiment of the present invention.

The network connection unit 300 includes a MAC controller 371 within the call processing unit 370 to process the ATM signal provided directly from the user modem of the CPE 500 or 510, without connection through the head-end unit 400, as shown in FIGS. 5 and 6. The MAC controller 371 controls the user modems corresponding to the user applications by the MAC control instructions for the signal processing of the ATM signal processing unit 350. The network connection unit 300 assigns a channel and establishes an wireless channel between the user application and the corresponding head-end unit 400 to operate the entire system since the network connection unit 300 manages the ATM signal processing data base for all user applications. The corresponding head-end unit 400 establishes a constant correspondence relation between a local identification and a virtual path identifier/a virtual channel identifier (VPI/VCI) identifying each user application from all user applications.

The virtual connection path to the VPI/VCI corresponding to each local identifier is set when the system is initialized. The head-end unit 400 transmits the information for a time slot which is assigned by the MAC controller 371 to the user modem of the corresponding CPE 500 or 510.

Figure 7:
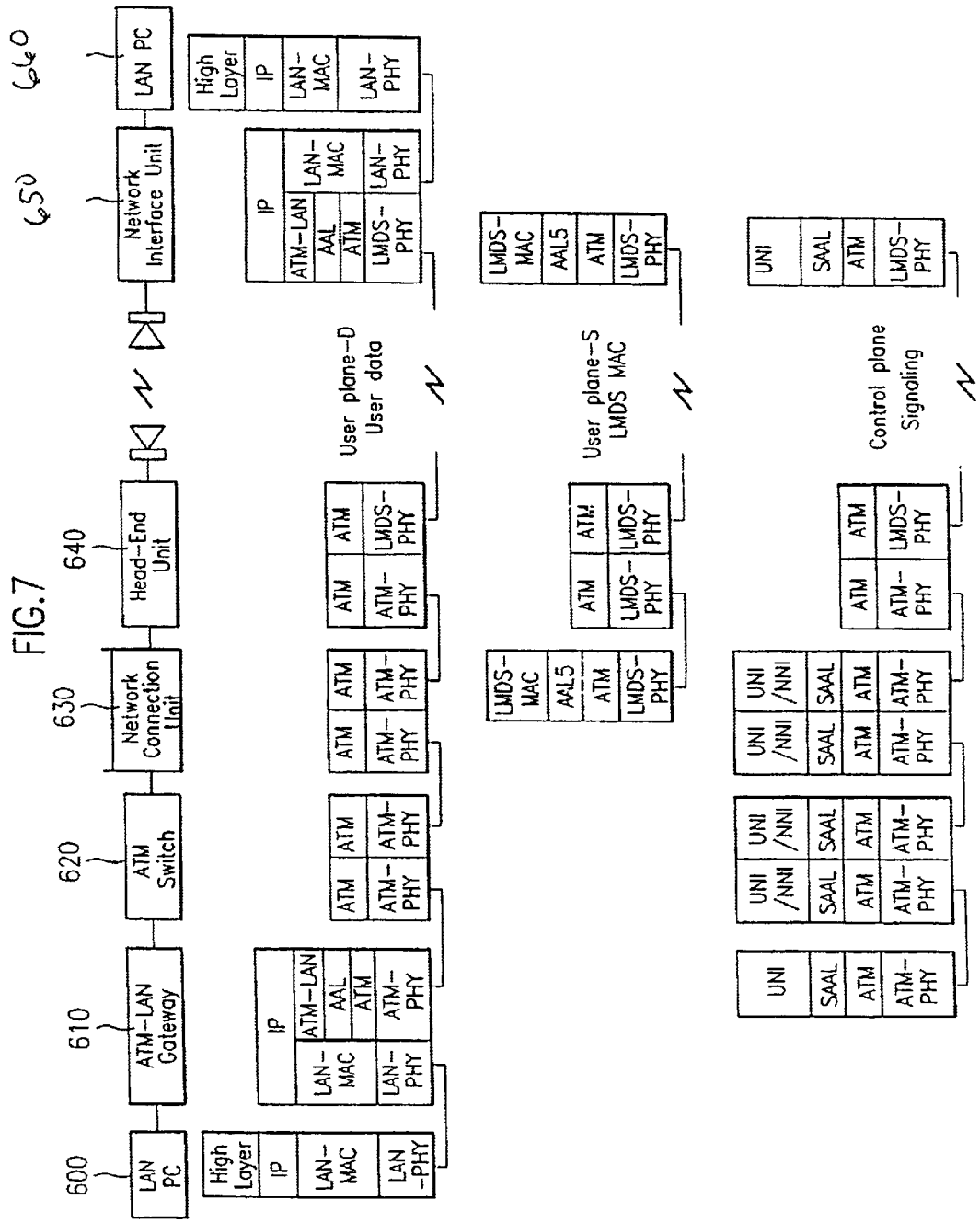
FIG. 7 illustrates a protocol stack configuration according to the third preferred embodiment of the present invention.

If the channel assignment is requested from the CPE 500 or 510, the head-end unit 400 receives and transfers the request to the network connection unit 300. The network connection unit 300 performs an authentication test with the data base to confirm that the originating party requesting the channel assignment is authenticated. If the authentication test fails, the network connection unit 300 send an error message to the CPE 500 or 510. If the authentication test succeeds, the MAC controller 371 assigns channel for communication. An example protocol stack configuration for this case is shown in FIG. 7. The protocol stack configuration includes an user plan D for transmitting user data, a user plane-S for transmitting LMDS MAC messages, and a control plane for transmitting signal processing as also illustrated in FIG. 4.

In the third preferred embodiment of the present invention, the head-end unit 640 transmits ATM cell data to a destination, and the network connection unit 630 includes LMDS MAC, UNI, or NNI layers. To enable data service for each subscriber, the virtual channel should be established from a LMDS-PHY layer of the user plane-S to a LMDS-MAC layer between the network connection unit 630 and the NIU 650.

Then, the protocol communication from a SAAL layer to a UNI layer is performed via the control plane between the network connection unit 630 and the NIU 650. Thus, the communication path from the network connection unit 630 to the terminating LAN PC terminal 600 is connected through the ATM-LAN gateway 610. Accordingly, each LAN PC terminal 600 and 660 can receive or transmit the user data from or to each other through the applicable user plane. Therefore, in the third preferred embodiment of the present invention, the LMDS 100 can reduce an overhead occurring in the second embodiment, since the ATM signal processing is provided in the network connection unit 630 and merely transmitted by the head-end unit.

In the fourth preferred embodiment of the present invention, the network connection unit of the local multipoint distribution system (LMDS) establishes a virtual circuit to allow a bidirectional communication on ATM network and the head-end unit provides a medium access control (MAC) protocol for perform multiplexing/demultiplexing provides routing operations for data to be transmitted or received.

Figure 8:
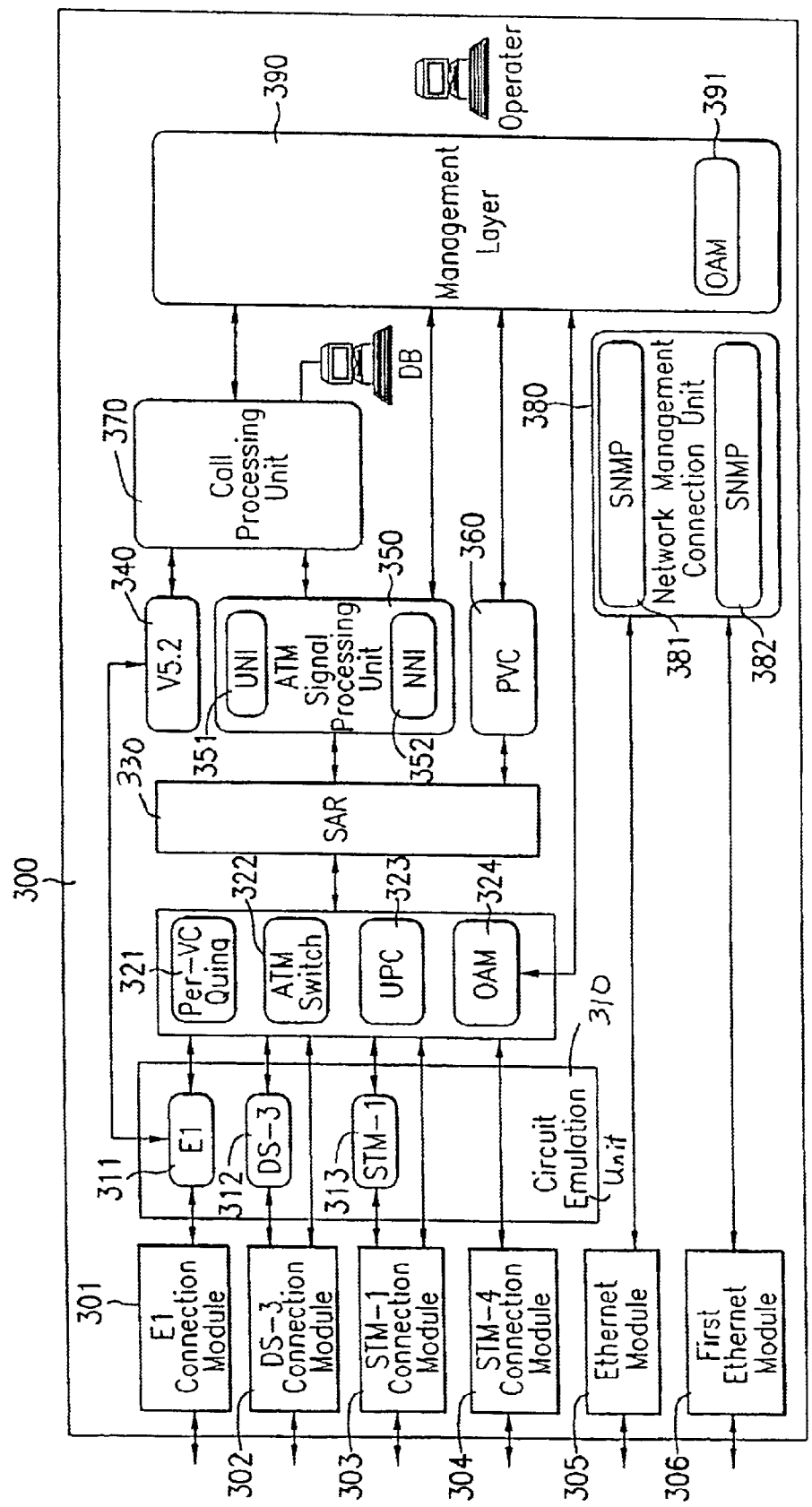
FIG. 8 is a block diagram of a network connection unit of the LMDS according to a fourth preferred embodiment of the present invention.

FIG. 8 is a block diagram of a network connection unit 500 of a LMDS according to the fourth preferred embodiment of the present invention and is similar to the network connection unit 300 of the third preferred embodiment as shown in FIG. 5. Referring to FIG. 8, the network connection unit 300 provides call processing by the call processing unit 370, ATM signalling processing by the ATM signalling processing unit 350, call control function by the UPC 323, and operation and resource management by the management layer 390.

As also shown in FIG. 8, the network connection unit 300 includes a plurality of connection modules 301 through 306, a circuit emulation unit 310, an ATM switch 322, a usage parameter controller (UPC) 323, a segmentation and reassembling section (SAR) 330, a ATM signal processing unit 350, a call processing unit 370, a network management connection unit 380, and a management layer 390. However, the call processing unit 370 shown in FIG. 8 does not require a MAC controller 371, as shown in FIG. 5, to enable the fourth preferred embodiment of the present invention.

Figure 9:
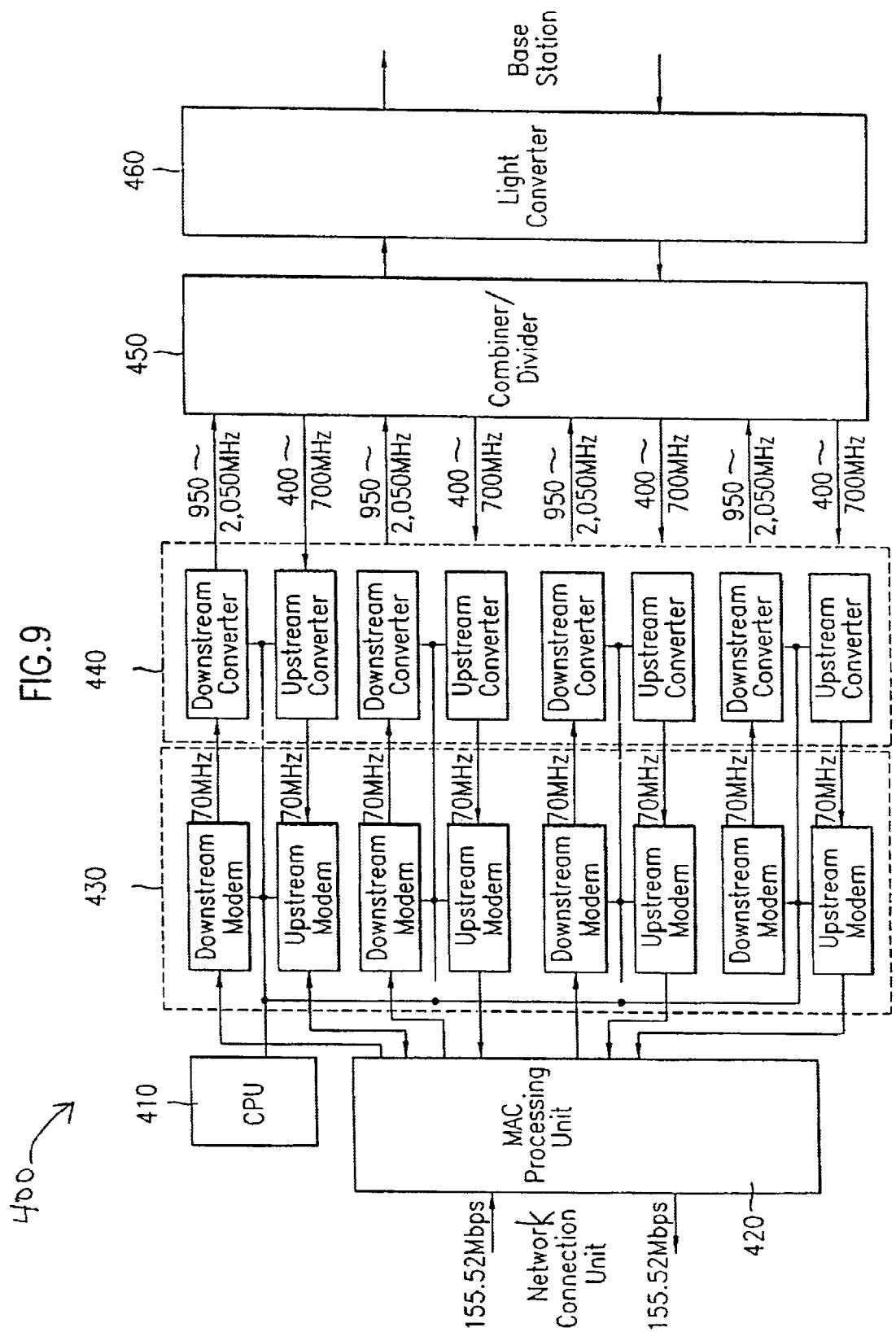
FIG. 9 is a block diagram of a head-end unit of the LMDS according to the fourth preferred embodiment of the present invention.

FIG. 9 is a block diagram of a head-end unit 400 of the LMDS according to the fourth preferred embodiment of the present invention and is substantially similar to the head-end unit 400 illustrated in FIG. 2. Referring to FIG. 9, the head-end unit 400 includes a central processing unit (CPU) 410, a MAC processing unit 420, a modem section 430, a frequency converting section 440, a combiner/divider 450, and a light converter 460. The head-end unit 400 illustrated in FIG. 9 does not show a ATM signalling unit and a server as shown in FIG. 2.

If the head-end unit 400 has a switch function, the virtual channel can be established between the user applications as disclosed in the second preferred embodiment of the present invention. However, if the network connection unit 300 directly controls each user application, the head-end unit 400 may not require switch function capabilities, but would require data assembling capabilities as disclosed in the third preferred embodiment of the present invention.

In the fourth preferred embodiment of the present invention, the network connection unit 300 provides all servicing, supplement functioning, statistics controlling and billing control. Also, the network connection unit 300 transmits to the MAC processing unit 420 resource information assigned for ATM signal processing according to its own traffic amount since the network connection unit 300 supports bearer connection control protocol (BCCP). Accordingly, the MAC processing unit 420 of the head-end unit 400 can assign the wireless channel using the resource information.

The head-end unit 400 identifies the user applications connected to the CPE 500,510 and establishes the constant correspondence relation between the local identifier LI and VPI/VCI identifying each user application. Thus, service quality is supported according to the requirements of the ATM signal processing when accessed to a VPI/VCI corresponding to each LI.

Also, the ATM signal processing uses virtual channel connection (VCC)(0/1) for meta signal processing and uses virtual channel connection (VCC)(0/5) for other signal processing.

As shown in FIG. 8, each of the connection modules 301 through 306 receives data forwarded from switches 112 through 114 and searches for corresponding frame synchronization from the received data stream, and then extracts corresponding billing information. Also, Each connection module 301 through 306 creates frames to be transmitted and maps the corresponding billing information. The ATM switch 322 switches ATM cell data provided from the corresponding connection module 301 through 306 via the circuit emulation unit 311. The UPC 323 protects the network resource from abnormal operation or errors effecting the service quality of the established call connection, and detects a parameter violation and performs proper controlling.

The SAR 330 segments the data provided from the ATM switch 322 or UPC 323 and outputs it to the ATM signal processing unit 350, and assembles the data provided from the ATM signal processing unit 350 for output to the ATM switch 322. The ATM signalling processing unit 350 establishes the virtual channel with a permanent virtual connection (PVC) or a switched virtual connection (SVC) approach and operates the user-network interface (UNI) 351 and the network-network interface (NNI) 552 based on the type of bit rate, for example, constant bit rate, variable bit rate, unspecified bit rate, or available bit rate.

Accordingly, after ATM signal processing, the channel information can be transmitted to the MAC processing unit 420 of the head-end unit 400 via the BCCP when the channel is assigned to a subscriber using the channel information. Thus, the MAC processing unit 420 of the head-end unit 400 is connected to the network connection unit 300 for multiplexing/demultiplexing the ATM data to perform ATM communication for the digital signal level, for example of STM-1 at 155.52 Mbps, and routes the received ATM data from the network connection data after analysing the received data to be forwarded to the corresponding CPE 500 or 510. Also, the MAC processing unit 420 forms data frames for forwarding to each CPE 500 or 510 a constant bit rate data, a variable bit rate data, or control data according to the received data type. The MAC processing unit 420 forwards the data provided from each CPE 500 and 510 after analysing the received data. Meanwhile, the CPU of the head-end unit controls the operation of the modem section 430 and the frequency converting section 440.

Figure 10:
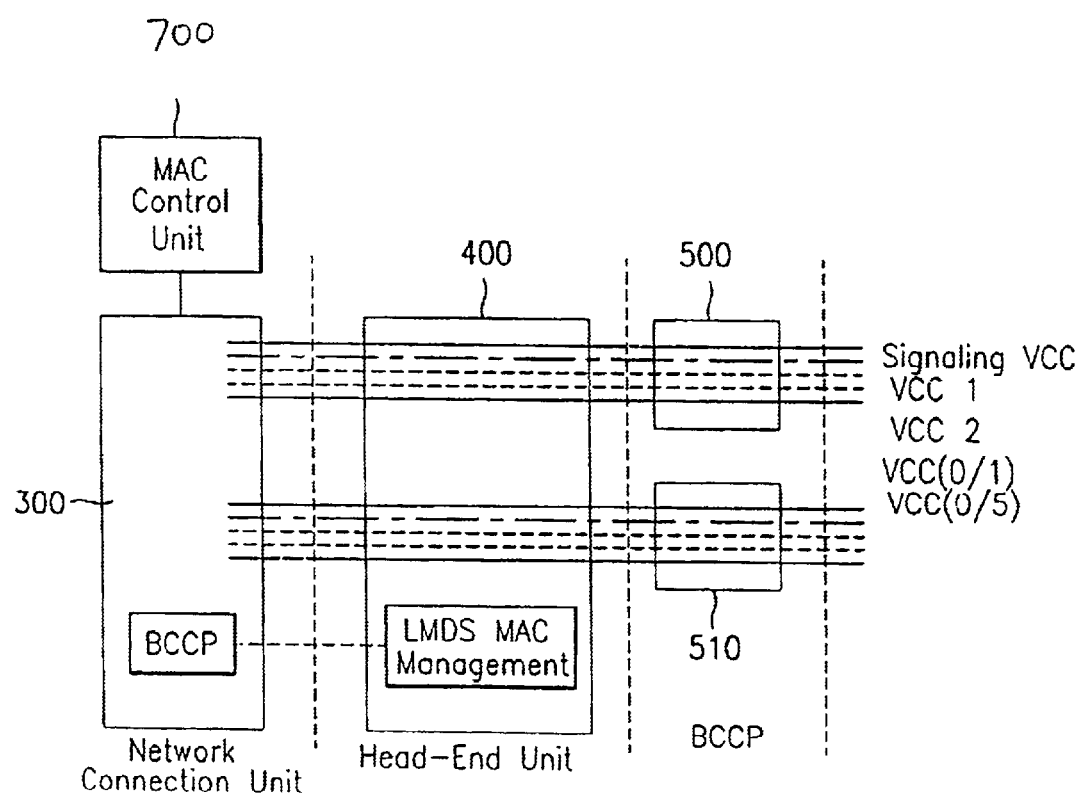
FIG. 10 is a view illustrating a connection state of a virtual channel for processing ATM signalling for a network connection unit according to the fourth preferred embodiment of the present invention.

In another example of the fourth preferred embodiment, as shown in FIG. 10, a MAC control unit 700 is coupled to the network connection unit for providing an operation substantially similar to the operation of the MAC controller 371 described above for the third preferred embodiment. In other words, the MAC control unit 700 controls user connections in accordance with MAC control instructions for ATM signal processing. Accordingly, in the fourth preferred embodiment, either the head-end unit 400 or a MAC control unit 700 provides MAC protocol.

In these examples of the preferred embodiments of the present invention, the downstream data size is a MPEG-2 transport stream depending on the DAVIC recommendations. The MAC processing unit 420 forms the downstream structure formation and forwards it to the corresponding downstream modem of the modem section 430. Also, the MAC control data passed through the upstream is processed in the MAC processing unit 420 and the ATM signal processing is transmitted to the network connection unit 300 via the BCCP.

Each downstream modem of the modem section 430 encodes the downstream data of a first length, for example, 188 byte sections, received from the MAC processing unit 420 with a Reed Solomon approach and then generates downstream data of a second length, for example, 204 byte sections by adding the difference in length, 16 bytes in this example, of surplus data. Next, convolution interleaving (I=12, M=17) and convolution encoding (R=½,K=7) are performed to the downstream data and modulated by. Next, the downstream converter converts the modulated signal from the downstream modem into inter-frequencies of 950~2,050 MHz and forwards the converted signal to the combiner/divider 450. The combiner/divider 450 combines the inter-frequencies transmitted from each downstream modem and forwards the combined signal to the light converter 460 for converting the electrical signal to a light conversion signal and transmitting the light conversion signal to the base station 135.

The upstream data transmitted from a CPE 500, 510 is converted to a low frequency of 400~700 MHz in the base station 135 and is transmitted to the head-end unit 400 via the light cable. The light converter 460 of the head-end unit 400 converters the upstream data received via the light cable into electrical signals, and the combiner/divider 450 divides the electrical signal into a plurality of signals and forwards them to the frequency converting section 440.

Each upstream converter of the frequency converting section 440 converts the received upstream data into the low frequency of 70 MHz and forwards the converted data to a corresponding upstream modem of the modem section 430. Each upstream modem of the modem section 430 converts the upstream data of an upstream data length of, for example, 63 bytes into ATM cell data of an ATM data length of, for example, 53 bytes by applying Reed Solomon manner techniques (63, 65,t=5) as a forward error correction procedure and forwards the resulting data to the MAC processing unit 420.

The MAC processing unit 420 receives and analyses the upstream data. At this time, if the data is control data, it is forwarded to the call processing unit 370 of the network connection unit 300. However, if the data is to be transmitted to the network, the MAC processing unit 420 multiples the data into 155.52 Mbps data and forwards it to the network connection unit 300. Accordingly, the network connection unit 300 transmits the multiplexed ATM cell data to a corresponding destination.

According to the fourth preferred embodiment of the present invention, since the network connection unit 300 directly controls each user application by performing the ATM signal processing and the head-end unit 400 provides MAC processing, an improved and simple LMDS is embodied. Also, the LMDS of the preferred embodiment of the present invention can be used with related art communication systems, and the related art network connection unit and MAC processing unit are improved accordingly.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus comprising a local multipoint distribution system wherein the local multipoint distribution system comprises:

a central office unit for multiplexing a downstream data stream having an asynchronous transfer mode (ATM) cell structure, or demultiplexing an upstream data stream having the ATM cell structure; and a head-end unit for modulating the multiplexed downstream data stream having the ATM cell structure provided from the central office unit, and demodulating the upstream data having the ATM cell structure into a data stream and forwarding the data stream to the central office unit, wherein one of the central office unit or the head-end unit establishes a virtual channel between the central office unit and the head-end unit to enable bi-directional communication in a communication network, and provides a medium access control (MAC) protocol for routing a data, including the data stream, the downstream data stream, and the upstream data stream, to a corresponding destination, wherein the central office unit comprises a network connection unit for multiplexing the downstream data stream, demultiplexing the upstream data stream, and routing the data stream to a corresponding terminating party, and wherein the network connection unit comprises:

a signal processor for setting a virtual channel and a channel speed, and providing an ATM service corresponding to the virtual channel; and a call processor having a MAC controller for controlling user modems according to MAC instructions when the signal processor is operating.

2. The apparatus of claim 1, wherein the head-end unit comprises:

a processor connected to the central office unit, for multiplexing or demultiplexing the data in the communication network, analyzing and routing the data to the corresponding destination and providing a control data based on the data; and a signaling circuit for connecting the virtual channel according to the control data of the processor.

3. The apparatus of claim 2, wherein the head-end unit further comprises:

a modem for modulating and outputting the downstream data stream from the processor into a low frequency downstream data stream, or converting a low frequency upstream data stream into the upstream data stream having the ATM cell structure to be outputted to the processor;

a frequency converter for converting an intermediate frequency upstream data stream into the low frequency upstream data stream and forwarding the low frequency upstream data stream to the modem, or converting the low frequency downstream data stream into an intermediate frequency downstream data stream having an inter-media frequency bandwidth;

a combiner/divider for combining and outputting the intermediate frequency downstream data stream from the frequency converter, or dividing an inputted electrical signal and forwarding the inputted electrical signal to the frequency converter;

a light converter for converting and outputting the output signal of the combiner/divider into a light signal, or converting an upstream light signal into the inputted electrical signal; and a central processing unit (CPU) for controlling the modem and the frequency converter.

4. The apparatus of claim 2, wherein the processor forwards the control data to the signaling circuit, and multiplexes and transmits a user data according to the data to a peripheral device.

5. The apparatus of claim 1, further comprising at least one server for managing a data base for storing a service profile of each of a plurality of subscribers.

6. The apparatus of claim 1, wherein the signal processor establishes the virtual channel with a permanent virtual connection or a switched virtual connection between the central office unit and the head-end unit.

7. The apparatus of claim 6, wherein the signal processor provides a user-network interface and a network-network interface by selecting one of a constant bit rate, a variable bit rate, an unspecified bit rate, or an available bit rate.

8. The apparatus of claim 1, wherein the virtual channel is established by the network connection unit and the MAC protocol is established by a processor of the head-end unit that is connected to the network connection unit for multiplexing or demultiplexing the data.

9. The apparatus of claim 1, wherein the central office unit establishes the virtual channel between the central office unit and the head-end unit to enable bi-directional communication in the ATM service, and the head-end unit provides the MAC protocol for routing the data to the corresponding destination.

10. The apparatus of claim 1, further comprising an outdoor unit for amplifying and providing frequency conversion to the modulated downstream data from the head-end unit for transmission to the corresponding destination, and for amplifying and providing frequency conversion to an upstream data from the corresponding destination as the upstream data stream for transmission to the head-end unit.

11. The apparatus of claim 10, wherein the corresponding destination comprises:
an indoor unit that receives and modulates the amplified downstream data from the outdoor unit and transmits the upstream data to the outdoor unit; and
a peripheral device that receives the modulated amplified downstream data from the indoor unit, and transmits the upstream data to the indoor unit.

12. A method of communicating data in an apparatus comprising a local multipoint distribution system having a network connection unit, a head-end unit, and customer premises equipment, the method comprising:
establishing a virtual channel by performing a protocol communication from a first physical layer for prescribing wireless access media, to a second physical layer for providing wireless media control, of the customer premises equipment and either the network connection unit or the head-end unit;
connecting a communication path from one of the network connection unit or the head-end unit to a terminating party by performing a protocol communication between an adaption layer for signal processing to a user network interface layer of the customer premises equipment and said one of the network connection unit or the head-end unit;
processing the data between the terminating party and one of the network connection unit and the head-end unit; and transmitting the data between the terminating party and one of the network connection unit and the head-end unit.

13. The method of claim 12, wherein:
the virtual channel is established between the network connection unit and the customer premises equipment;
the communication path from the network connection unit to the terminating party is connected between the network connection unit, and the customer premises equipment;
the data is processed between the network connection unit and the terminating party; and
the data is transmitted between the network connection unit and the terminating party.

14. The method of claim 12, wherein:
the virtual channel is established between the head-end unit and the customer premises equipment;
the communication path from the head-end unit to the terminating party is connected between the head-end unit and the customer premises equipment;
the data is processed between the head-end unit and the terminating party; and
the data is transmitted between the head-end unit and the terminating party.

15. The method of claim 12, wherein connecting the communication path includes:
forwarding a resource information according to a traffic amount to a processing unit of the head-end unit by a bearer connection control protocol supported in the network connection unit; and
assigning a wireless resource using the resource information.

16. The method of claim 12, further comprising providing a constant correspondence relation between a local identification and a virtual path identifier/virtual channel identifier (VPI/VCI) identifying each user application from all user applications.

17. The method of claim 16, wherein a necessary service quality is supported to the head-end unit according to a negotiation by a signal processing when providing the constant correspondence relation.

18. An apparatus comprising a network communication unit of a local multipoint distribution system wherein the network communication unit comprises:
a converter that multiplexes or demultiplexes a data stream;
a signal processor that establishes a virtual channel to enable bidirectional communication of the data stream with a destination; and
a controller coupled to the signal processor, that controls a routing of the data stream to the destination,
wherein the signal processor sets the virtual channel and a channel speed and provides an asynchronous transfer mode service corresponding to the virtual channel, and the controller accesses user modems according to medium access control instructions and assigns time slots and channels for communication with the user modems.

19. The apparatus of claim 18, wherein the controller includes a MAC controller which provides a medium access control protocol for the routing.

20. The apparatus of claim 18, wherein the converter comprises:
a usage parameter control circuit, coupled to a central office unit, that detects errors in the established call connections and controls the usage of the established call connection;
a switch, coupled to the central office unit, that switches inputted asynchronous transfer mode cell data; and
a segmentation and reassembly circuit coupled to the usage parameter control circuit, the switch, and the signal processor for segmenting output data from the usage parameter control circuit and the switch, and assembling processed data from the signal processor.

21. The apparatus of claim 18, further comprising a MAC controller, coupled to the signal processor, that provides a medium access control protocol for the routing.

22. An apparatus comprising a head-end unit of a local multipoint distribution system wherein the head-end unit modulates a data stream having an asynchronous transfer mode (ATM) cell structure and comprises:
   a processor that provides a medium access control protocol for routing the data stream in a communication network;
   a modem for modulating and outputting the data stream from the processor into a low frequency downstream data stream, or converting a low frequency upstream data stream into the data to be outputted to the processor;
   a frequency converter for converting an intermediate frequency upstream data stream into the low frequency upstream data stream and forwarding the low frequency upstream data stream to the modem, or converting the low frequency downstream data stream into an intermediate frequency downstream data stream having an intermediate frequency bandwidth, and
   wherein the processor is coupled to a network connection unit and multiplexes or demultiplexes the data stream, analyses and routes the data stream to a destination, and provides a control data based on the routed data stream, and
   wherein the network connection unit comprises:
   a signal processor for setting a virtual channel and a channel speed, and providing an ATM service corresponding to the virtual channel; and
   a call processor having a MAC controller for controlling user modems according to MAC instructions when the signal processor is operating.

23. The apparatus of claim 22, wherein the processor includes:
   a signaling circuit that establishes a virtual channel between the head-end unit and a network communication unit to enable bidirectional communication in the communication network; and
   a central processing unit for controlling the modem and the frequency converter.

24. The apparatus of claim 23, wherein the head-end unit provides a switch function between the network connection unit and a destination.

25. The apparatus of claim 23, wherein:
   the signaling circuit connects the virtual circuit according to the control data of the processor.

26. The apparatus of claim 23, wherein the processor forwards the control data to the signaling circuit and multiplexes and transmits the user data to a peripheral device.

27. The apparatus of claim 22, wherein the processor is coupled to a network connection unit for receiving a virtual channel information, to route the data stream based on the virtual channel information.

28. The apparatus of claim 22, further comprising:
   a combiner/divider for combining and outputting the intermediate frequency downstream data stream from the frequency converter, or dividing an inputted electrical signal and forwarding the inputted electrical signal to the frequency converter; and
   a light converter for converting and outputting the output signal of the combiner/divider into the light signal, or converting an upstream light signal into the inputted electrical signal.

* * * * *